United States Patent [19]

Sami et al.

[11] Patent Number: 5,782,104
[45] Date of Patent: Jul. 21, 1998

[54] INTEGRATED AIR CONDITIONING SYSTEM WITH HOT WATER PRODUCTION

[75] Inventors: Samuel M. Sami, Moncton; David Elkaim, St. Laurent; Jean-Guy Chouinard, Verdun; Kébir Ratnani, Boucherville, all of Canada

[73] Assignees: Société en commandite Gaz Métropolitain, Canada; Gaz de France, France

[21] Appl. No.: 667,868

[22] Filed: Jun. 20, 1996

[51] Int. Cl.$^6$ .............................. F25D 23/00; F25B 27/00
[52] U.S. Cl. ........................... 62/271; 62/94; 62/238.1
[58] Field of Search ..................... 62/238.1, 288.3, 62/331, 332, 333, 271, 94

[56] References Cited

U.S. PATENT DOCUMENTS

| | | | |
|---|---|---|---|
| 3,550,677 | 12/1970 | Knowles | 165/108 |
| 4,180,126 | 12/1979 | Rush et al. | 165/59 |
| 4,241,588 | 12/1980 | Murphy et al. | 62/238.1 |
| 4,265,219 | 5/1981 | Thomason | 126/419 |
| 4,715,192 | 12/1987 | Katz | 62/323.1 |
| 5,042,266 | 8/1991 | Yamashita et al. | |
| 5,189,884 | 3/1993 | Sami | 62/324.2 |
| 5,353,606 | 10/1994 | Yoho et al. | |
| 5,373,704 | 12/1994 | McFadden | 62/94 |
| 5,423,187 | 6/1995 | Fournier | |
| 5,435,150 | 7/1995 | Khelifa et al. | |
| 5,495,721 | 3/1996 | Stueble | 62/121 |
| 5,502,975 | 4/1996 | Brickley et al. | |

*Primary Examiner*—William Doerrler
*Attorney, Agent, or Firm*—Swabey Ogilvy Renault; Guy J. Houle

[57] ABSTRACT

An integrated air conditioning and hot water supply system for conditioning air and supplying hot water to a building is described. The system incorporates a hot water tank in the system which feeds a heat exchanger to heat air which is recirculated from the building when required during cool weather periods. A combined air dehumidification device and cooling device are also provided to dehumidify and cool return air from the building in a recirculation circuit when required by the building during warm weather periods. The cooling devices incorporate coils connected to the city water supply whereby to preheat a supply of water to the hot water tank. The combined circuit also cools fresh air and treats it to provide a source of heated air to regenerate a desiccant wheel which is used as the dehumidification device. A heat recovery ventilator is also incorporated in the integrated system to treat exhaust air from the building during cool weather periods and to admit warmed fresh air thereto.

18 Claims, 3 Drawing Sheets

Fig. 1

INTEGRATED AIR CONDITIONING SYSTEM WITH HOT WATER PRODUCTION

TECHNICAL FIELD

The present invention relates to a fully integrated air conditioning and hot water supply system for conditioning air and supplying hot water to a building during hot and cold weather periods.

BACKGROUND ART

Various air conditioning systems are known for heating and cooling recirculated air and producing hot water but to date no efficient integrated system having the capability of achieving these objectives has been provided. In U.S. Pat. No. 5,502,975 there is described a method and an apparatus for conditioning air for a building and in which outside ambient air is dried in a desiccant wheel dehumidifier and cooled in a heat exchanger while maintaining the moisture content thereof relatively unchanged. Thereafter the air stream is cooled by passing it over cooling elements whose surface temperature under normal operating conditions is higher than the dew point of the cooled and dried air leaving the heat exchanger. This cooled outside air stream is then supplied to the building while the return air is withdrawn from the building and supplied to the heat exchanger to pass in heat exchange relationship to the dried outside air stream in order to reduce the temperature of the air stream in the heat exchanger while increasing the temperature of the enclosed return air which can either be exhausted to atmosphere or used to reactivate the desiccant wheel before being returned to the atmosphere. This system is essentially a dehumidification system and is very costly to construct and does not provide HVAC & R as well as DHW. Heating is provided in this system by a natural gas burner and no ventilation means is provided. Also, air conditioning is accomplished by an electrical vapor compression system using CFC'S.

In U.S. Pat. No. 5,373,704, there is described an air recirculation and conditioning system for recirculating and dehumidifying air within a living space. The system diverts a portion of the air recirculated through a return and removes moisture from that portion of the air before mixing the drier air with the air in the return. The system also makes use of a standard water heater as a source of heat to heat a regenerative air stream to regenerate a desiccant wheel of the system. The system also externally draws all of the air from the regenerative air stream and exhausts the regenerative air stream to an air space external of the living space within which the air is being treated.

In U.S. Pat. No. 5,353,606, an apparatus is disclosed for an air conditioning system for admitting air from an exterior space, adjusting the temperature and humidity of the exterior air, delivering the adjusted air to an interior space of a structure, removal of exhaust air therefrom and return of the exhaust air to the exterior space and wherein a regenerative desiccant is provided for removing water vapor from the air to be delivered to the interior space and delivering the water vapor to the exhaust air stream and a heat exchanger is provided for removing sensible heat from the air to be delivered to the interior space and transferring the sensible heat to the exhaust air stream. The apparatus combines for the first time electric air conditioning reheat and solar energy with desiccant technology, thereby furnishing conditioned air at an 80% reduction of energy cost. The apparatus for the first time allows the use of waste oil heat to furnish conditioned air at an 80% reduction in energy cost. Additionally, natural gas or propane gas may be used at a great reduction in energy cost vs. electrical cost. The apparatus allows the reduction in electrical power presently used to condition air for use in a given space.

U.S. Pat. No. 5,435,150 discloses an apparatus for heating and/or cooling a cabin, especially a passenger compartment of a motor vehicle, a sleeping cabin of a truck, etc. To the cabin there is respectively connected an intake-air duct and a waste-air duct. The apparatus includes a sorption reactor which is filled with zeolite, or the like, and through which an air-current flows via corresponding ducts. In the adsorption phase of the reactor, the air-current takes up adsorption heat and releases moisture. After being cooled down via a humidifier, the air-current cools the intake-air current to the cabin. In addition, a heating device is provided for heating up the air current for the desorption of the reactor, the heated air current being evacuated with the moisture taken up from the sorbent. In order to provide sufficient heating capacity, even at low external temperatures, without placing a load upon the sorption reactor, the air current is selectively made to flow through the heating device into either a duct to the reactor or directly as a heating-air current to the cabin via an air current control element.

U.S. Pat. No. 4,180,126 relates to an air conditioning apparatus for heating and cooling by providing a combination of a primary heater and a secondary heater for heating the regeneration stream for regenerating the desiccant means in the air conditioning apparatus. The thermal source for the primary heater may utilize waste heat or solar energy which is transferred to a solid phase thermal storage means by a gaseous phase heat exchange medium. The thermal energy may be transferred from the thermal storage means to the regeneration stream of the open-cycle air conditioning apparatus either directly by passing the air stream over the solid phase thermal storage means or indirectly by passing liquid in an enclosed system through the solid phase thermal storage means and the regeneration stream.

In U.S. Pat. No. 5,423,187 there is described a rooftop air conditioning unit for conditioning air in a conditioned space with a rotary regenerative exchanger where sensible and latent heat transfer occur between exhaust air and fresh air with the use of a rotary regenerative exchanger. The exchanger is secured to the housing of the unit in front of a side opening adjacent the air circuit thereof. The position of the exchanger avoids a modification in the conditioned air ductwork of the conditioned space and allows sharing the same roof reinforcement structure with the original unit.

In U.S. Pat. No. 5,042,266 there is further described a refrigerating and humidity-regulating system for a container and utilizes a refrigerating unit having a humidity-regulating apparatus assembled therein. This humidity-regulating apparatus includes a solid adsorptive material, an air heater, an air blowing means, and an air circulation route for circulating inside and outside air through the air heater and the solid adsorptive material, in that sequence.

All of the above systems do not describe a fully integrated air conditioning system which further has the capacity to supply hot water to a building, be it commercial or residential, and wherein no CFC's are employed and which provides energy savings.

SUMMARY OF INVENTION

The present invention provides a fully integrated, air conditioning system having a heat recovery ventilator and providing heating and cooling for a residential or commercial or industrial building as well as a domestic hot water supply.
}

3

It is a further feature of the present invention to provide a fully integrated air conditioning and hot water supply system for conditioning air supplied to a building and utilizing in combination a domestic hot water tank, a heat recovery ventilator, a combined desiccant assisted evaporator and cooling circuit integrating city water as a cooling agent, and a hot water heat exchanger connected to the water tank.

Another feature of the present invention is to provide an integrated air conditioning and hot water supply system which is efficient and economical to construct and which is capable of cooling and heating recirculated air without the need to use outside air due to the use of a heat recovery ventilator.

Another feature of the present invention is to provide an integrated air conditioning and hot water supply system and which uses a natural gas burner as the source of heat for the hot water tank and capable of integrating therewith hot flue gases from an external source and fed into a heat exchanger device that may be mounted inside the hot water tank for contact with the water therein to heat the said water.

Another feature of the present invention is to provide an integrated air conditioning and hot water supply system which meets indoor air quality standards of the ASHRAE and Clean Air Act.

Another feature of the present invention is to provide an integrated air conditioning and hot water supply system which does not use any devices which usually generate bacteria growth.

Another feature of the present invention is to provide an integrated air conditioning and hot water supply system wherein heating is achieved by hot water, and air conditioning is accomplished through a combination of a cooling coil fed by the city water and an evaporative cooler.

Another feature of the present invention is to provide an integrated air conditioning and hot water supply system and wherein the hot water supply is provided by a natural gas-fired water heater or other type heaters which operate at very high efficiency with very little energy loss.

According to the above features, from a broad aspect, the present invention provides an integrated air conditioning and hot water supply system for conditioning air and supplying hot water to a building. The system comprises air circulation and integrated air conduit means to effect circulation of air to and from the building for conditioning by said system. A hot water tank having a water heating device produces hot water. A heat exchanger is fed by a hot water supply circuit from the tank for heating air recirculated from the building in the conduit means for heat exchange with the heat exchanger to heat the air when required by the building. Combined air dehumidification means and cooling means are provided to dehumidify and cool return air from the building in a recirculation circuit of the integrated conduit means when required by the building. The cooling means is connected to a water supply circuit to cool dehumidified air in the recirculation circuit and to provide cooling of a fresh air intake of the combined air dehumidification means and cooling means where the fresh air is treated and fed to the building in the integrated conduit means when required. Regeneration means is further provided to regenerate the dehumidification means. A heat recovery ventilator means treats exhaust air from the building and admits warmed fresh air thereto when required by the building.

BRIEF DESCRIPTION OF DRAWINGS

A preferred embodiment of the present invention will now be described with reference to the accompanying drawings in which:

4

Figure 1:
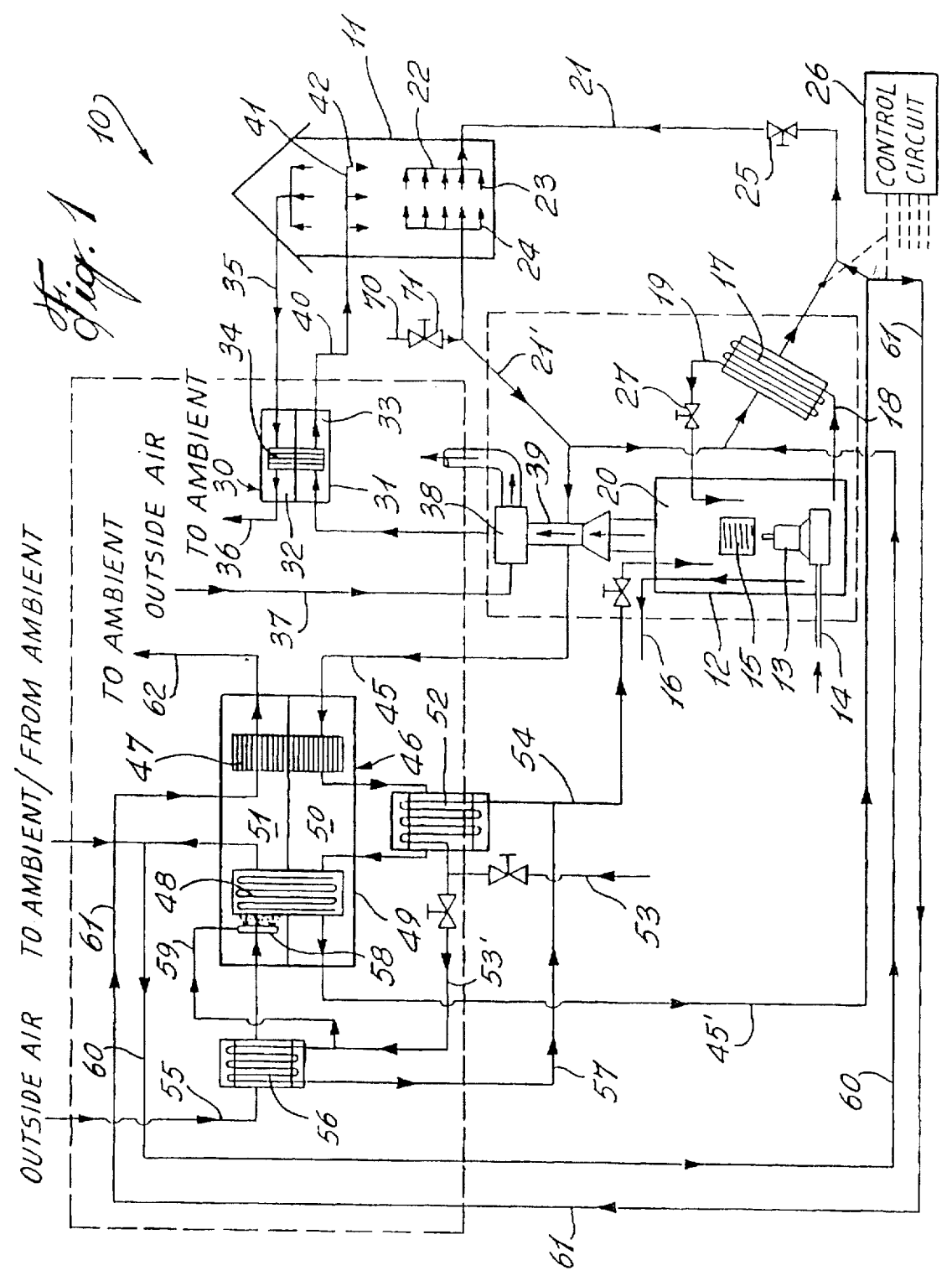
Figure 2:
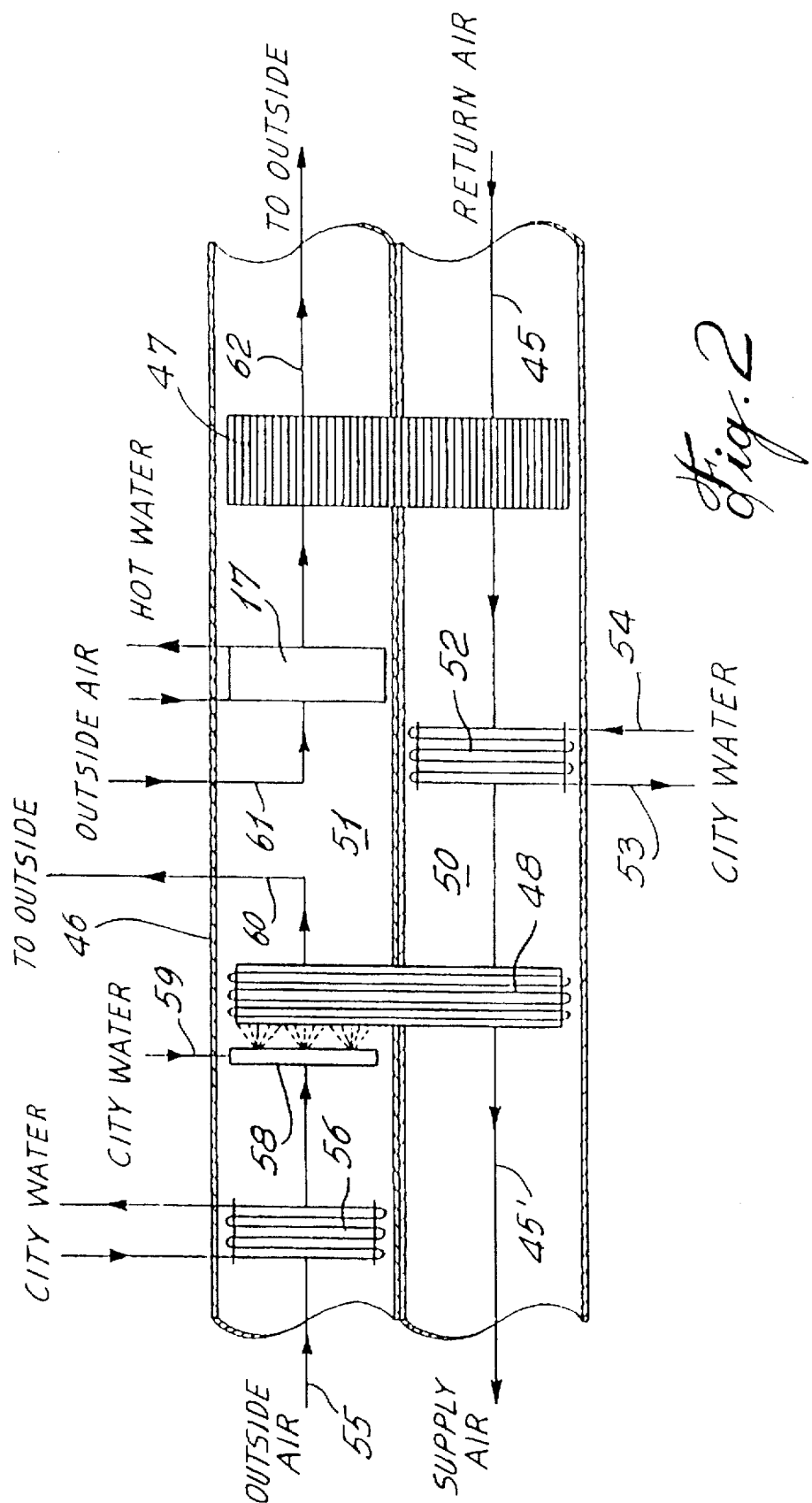
Figure 3:
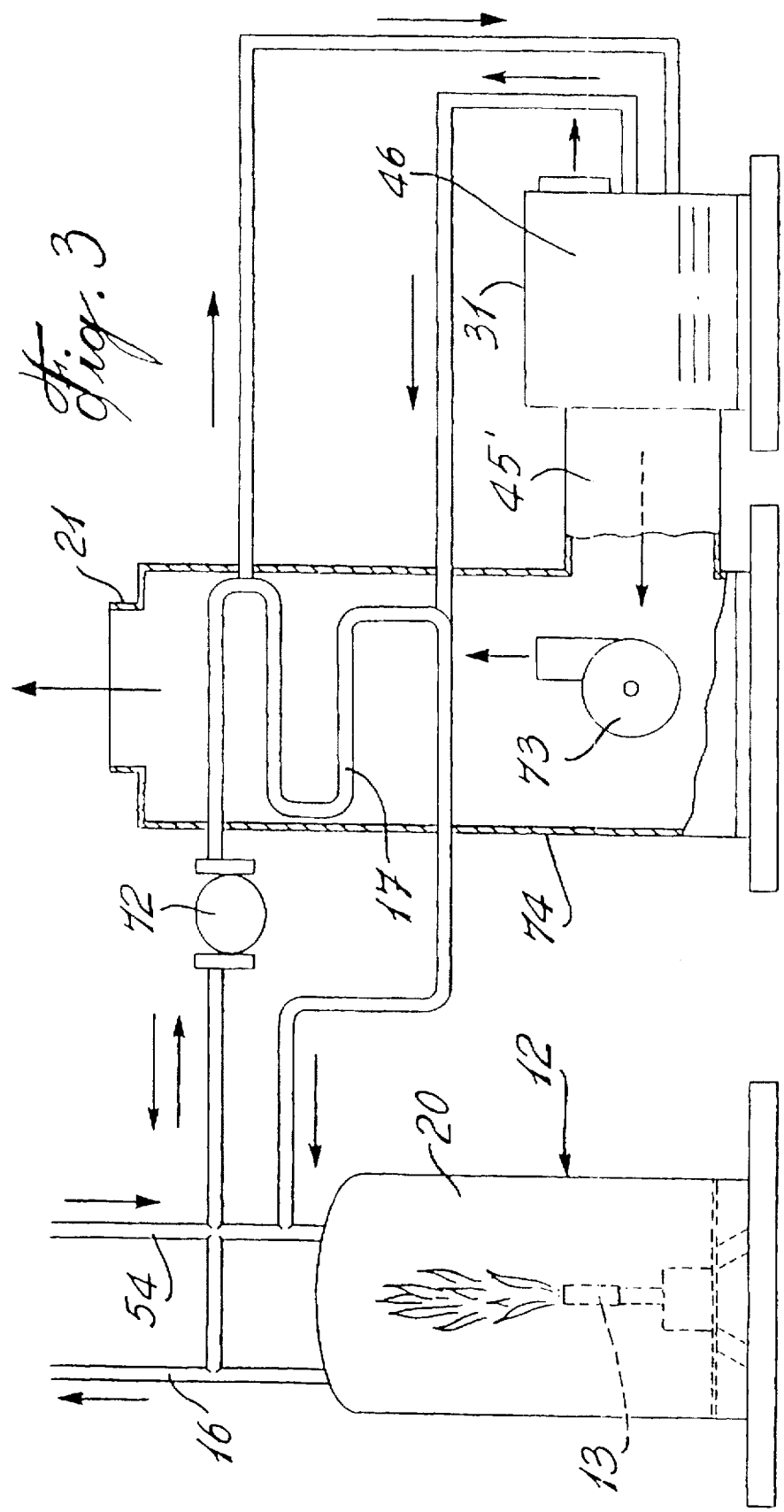

FIG. 1 is a schematic diagram of the integrated air conditioning and hot water supply system of the present invention for conditioning air and supplying hot water to a building;

FIG. 2 is a simplified schematic view showing the combined dehumidification and cooling circuits and their associated devices; and FIG. 3 is a simplified diagram showing the plumbing and air duct connections of the system of the present invention.

DESCRIPTION OF PREFERRED EMBODIMENTS

Referring to FIG. 1, there is shown generally at 10 the integrated air conditioning and hot water supply system of the present invention for conditioning air in a building 11 and supplying domestic hot water thereto. Although schematically shown, it is to be understood that the system is provided with ducts and chamber to recirculate air to and from the building and to the various devices associated with the integrated system of the present invention. Blowers and pumps, not shown, also provide the necessary recirculation and pressures in the system to move the air. A control circuit controls the system and monitors the air in the building. Similarly, domestic hot water supply as well as supplies to cooling coils is provided by the normal water pressure in the city water supply.

The system 10 as herein schematically shown incorporates therein a domestic hot water tank 12 having a water heating device 13, herein constituted by a natural gas burner having an inlet conduit 14 to which natural gas is fed thereto in controlled amounts. Although a natural gas burner 13 is hereinshown, any other heating source may be used and supplied by oil, electricity, propane gas, etc. In combination therewith the hot water tank 12 may be provided with a flue gas recovery heat exchanger 15 which is connected to the tank 12 to feed in a heat exchange device positioned in the tank to circulate therein hot gases recovered from external flue gas producing devices (not shown) whereby to recover heat loss from these external devices. The heating devices are capable of producing hot water within the hot water tank to a temperature of about 170° F. A domestic hot water conduit 16 feeds hot water to the building at a temperature of about 140° F.

As hereinshown a heat exchanger 17 in the form of a heat exchange coil is connected to a hot water supply circuit consisting of an inlet feed pipe 18 and a return pipe 19 interconnected to the reservoir 20 of the hot water tank 12. Suitable pump means, not shown, recirculates hot water through the heat exchanger 17. The hot water in the heat exchanger coil is at a temperature of about 170° F. and develops a capacity to heat air from the building fed therethrough by a convection duct network 21. The air enters the heat exchanger 17 at a temperature of about 70° F. and exits at about 97° F. thereby achieving a heating capacity of about 38,000 Btu/hr. This convection duct network 21 feeds an internal duct network 22 of the building which is provided with vents 23 to admit warm air into the building. Cool air is extracted through the vents 24 of a return convection duct network 21'. The convection duct network is provided with damper valves 25 which are controlled by a control circuit 26 secured within the building 11. As hereinshown the return feed pipe 19 of the hot water circuit may be provided with a valve 27, which is also automatically controlled, to cut off the heating coil, when necessary. The control circuit makes the system fully automatic to respond to the needs of the building.

During the cool weather periods, when the building is heated by the heat exchanger 12, it is also necessary to regenerate the air within the building and this is accomplished by a heat recovery ventilator 30. The heat recovery ventilator 30 comprises a housing 31 having an exhaust chamber 32 and a supply chamber 33. A heat recovery coil 34 is formed by a circuit of pipes having a refrigerant blend therein to extract heat from the pipes when in contact with hot air exhausted from the building. The exhaust air is convected in conduit 35 and through the exhaust chamber 32 thereby causing the refrigerant in the heat recovery coils 34 to turn to a vapor state. A large volume of the heat is thus extracted from the exhaust air by the refrigerant, with the cooler air being exhausted to ambient through an exhaust conduit 36.

In order to supply conditioned fresh air into the building an outside air inlet duct 37 draws in fresh air by the use of a pump (not shown but obvious to a person skilled in the art) and feeds it to a heat exchanger housing 38 which is connected in the hot gas exhaust duct 39 of the hot water tank whereby to extract heat from the exhaust gas and to simultaneously cool the exhaust gas to increase the efficiency of the hot water tank. This preheated fresh air is then fed to the supply chamber 33 of the heat recovery ventilator 30 where it is convected in contact with a portion of the heat recovery coils 34 to heat the preheated fresh air by condensation of the heated vaporized refrigerant blend. An outlet conduit 40 returns the preheated fresh air into the building 11 and releases it into an internal duct network 41 through associated vents 42.

The heat recovery ventilator 30 is capable of providing continuous ventilation at a rate of about 150 CFM or higher. Usually the hot air exhausted from the building through the exhaust conduit 35 is at a temperature of about 70° F. The fresh air extracted from the outside and fed to the heat exchanger 38 is at about a temperature of 5° F. and preheated to about 12° F. and then further heated in the ventilator to about 40° F. by the condensation of the hot vaporized refrigerant blend within the heat recovery coil 34.

During warm weather periods, and with additional reference to FIG. 2, return air in the duct 21'is fed in a closed convection circuit 45 to a combined air dehumidification and cooling system 46 which is comprised of a desiccant wheel 47 and an evaporator cooler 48 integrated together in a housing 49 having a supply chamber 50 and an exhaust chamber 51. The closed circuit 45 extends through the supply chamber 50 with the return air passes through the desiccant wheel 47 at about 1500 CFM or higher. The air is at a temperature of about 80° F. with about 60 percent relative humidity. This air is dehumidified across the desiccant wheel 47 to about 25 percent relative humidity and heated thereby to about 100° F. This dehumidified and heated return air is then cooled down by a cooling coil 52 which is placed in registry with the convected air in the closed circuit 45. The cooling coil 52 is connected to a city water supply pipe 53 to be fed continuous cooling water flow. As the water passes through the coil 52 it is preheated to exit the coil through conduit 54 which constitutes the inlet water feed pipe of the hot water heater 12.

The return air is then further cooled by the portion of the evaporative cooler 48 which extends through the supply chamber 50 to a temperature of about 65° F. and with a relative humidity of about 45 percent whereby to supply the building through the return convection duct 45' which is connected to the convection duct network 21 whereby to release the cooled conditioned air into the building 11 through the internal duct network 22. Accordingly, a non-mechanical compressor is used to produce cooling effect and no CFC's are employed in this system.

As hereinshown the exhaust chamber 51 of the air dehumidification and cooling system 46 is fed with an outside air supply through duct 55 and this air is pre-cooled in a second cooling coil 56 which is also connected to the city water line 53 by conduit 53'. This city water is recirculated through the coil 56 to continuously cool the incoming air in the duct 55 and at the same time heat the water to return it through conduit 57 into the feed pipe 54 to feed the hot water tank 12. This outside air in the inlet conduit 55 is usually at a temperature of about 95° F. with a 65 percent relative humidity and it is cooled down to about 75° F. by the second cooling coil 56. This air then enters into the exhaust chamber 51 where it is heated and sprayed to be saturated with water as it passes through the evaporative cooler 48. As hereinshown the evaporative cooler 48 has spray nozzles 58 fed by a feed pipe 59 which is also connected to the city water supply pipe 53'.

As can be seen in FIG. 1, a fresh air intake 70 may also feed into the return air or recirculated air conduits 21', 21, 45 and 45'. A valve 71 is controlled by the control circuit 26 to regulate the feed of said fresh air.

The slightly heated and humidified air is then convected through convection duct circuit 60 back into the heat exchanger 17 where it is heated to about 160° F. and then recirculated to the desiccant wheel through the convection circuit 61 to regenerate the desiccant wheel 47 for dehumidifying the return air from the building. After the desiccant wheel, the exhaust air is vented to ambient through exhaust conduit 62. The channeling of this regenerative hot air is controlled by various valves, such as valves 25 which are controlled by the control circuit 26. The cooling capacity of the evaporative cooler assisted by the cooling coil 52 is about 58,000 Btu/hr or could be higher.

Referring now to FIG. 3, there is shown a simplified diagram of the plumbing and air duct connections of the system of the present invention. As hereinshown the heating coil 17 is mounted in a heating module 74 having a blower 73 therein for circulating air into the convection duct network 21 after it has been heated by the coil 17. A water circulating pump 72 recirculates the hot water from the hot water tank 12 through the coil 17. As also hereinshown the dehumidification and cooling system 46 is integrated together with the outside air intake in a single unit 46. The convection duct network 21 can then be fed by the blower 73 in the module 74 by connecting the duct 45'directly thereto. The fresh air intake is also provided in this housing. This is a simplified view and accordingly it only illustrates the major components of the system. The heat recovery ventilator is a unit by itself and its outside air intake would be adapted to the exhaust flue of the water heater, not shown in this Figure but schematically illustrated in FIG. 1.

It can be appreciated that the integrated air conditioning and hot water supply system as above described is highly efficient in its recovery of heat loss and a comparative analysis with all electric systems indicates remarkable cost savings.

It is within the ambit of the present invention to cover any obvious modifications of the examples of the preferred embodiment described herein, provided such modifications fall within the scope of the appended claims.

We claim:

1. An integrated air conditioning and hot water supply system for conditioning air and supplying hot water to a building, said system comprising air circulation and integrated air conduit means to effect circulation of air to and from said building for conditioning by said system, a hot water tank having a water heating device to produce hot water in said tank, a heat exchanger fed by a hot water supply circuit from said tank for heating air recirculated from said building in said conduit means for heat exchange with said heat exchanger to heat said air when required by said building, combined air dehumidification means and cooling means to dehumidify and cool return air from said building in a recirculation circuit of said integrated conduit means when required by said building, said cooling means being connected to a water supply circuit to cool dehumidified air in said recirculation circuit and to provide cooling of a fresh air intake of said combined air dehumidification means and cooling means where said fresh air is treated and fed to said building in said integrated conduit means when required, regeneration means to regenerate said dehumidification means, and heat recovery ventilator means to treat exhaust air from the building and to admit warmed fresh air thereto when required by said building, wherein said hot water tank having a water feed inlet connected to said water supply circuit, said cooling means connected to said water supply circuit providing a pre-heating source for city water connected to said water feed inlet whereby to feed warm water to said tank when said combined air dehumidification means and cooling means are in operation as required by said building, said cooling means having a first cooling coil in which said city water is circulated, said first cooling coil being disposed in said recirculation circuit for cooling air from an outlet of said dehumidification means, and a second cooling coil for pre-cooling said fresh air intake of said combined air dehumidification means and cooling means.

2. An integrated air conditioning and hot water supply system as claimed in claim 1 wherein said heating device of said hot water tank is a natural gas burner.

3. An integrated air conditioning and hot water supply system as claimed in claim 2 wherein said heating device further comprises a flue gas recovery heat exchanger connected to said tank for recovering heat loss from one or more hot flue gas producing devices to heat said water in said tank.

4. An integrated air conditioning and hot water supply system as claimed in claim 1 wherein said first and second cooling coils are interconnected by valve means and feed said water feed inlet of said tank.

5. An integrated air conditioning and hot water supply system as claimed in claim 2 wherein said heat exchanger is a heat exchange coil fed by a hot water supply, said heat exchange coil being connected in a closed hot water conduit circuit from said tank.

6. An integrated air conditioning and hot water supply system as claimed in claim 2 wherein said dehumidification means is a desiccant wheel to dehumidify said return air from said building.

7. An integrated air conditioning and hot water supply system as claimed in claim 6 wherein said regeneration means comprises an evaporative cooler for treating pre-cooled outside air fed to an exhaust chamber of said combined dehumidification means and cooling means wherein said pre-cooled outside air is slightly heated, sprayed by a spraying device and saturated with water in said exhaust chamber to produce hot humid air which is fed by said integrated air conduit means through a heat exchange coil, connected in a closed hot water conduit circuit of said hot water tank; said air from said heat exchange coil being fed through said desiccant wheel in said exhaust chamber to regenerate said desiccant wheel.

8. An integrated air conditioning and hot water supply system as claimed in claim 7 wherein said outside air is pre-cooled by a cooling coil connected to said water supply circuit, said spraying device being connected to said water supply circuit, said water supply circuit being fed by a city water supply source, said spraying device cooling a refrigerant gas in said evaporative cooler and simultaneously humidifying said pre-cooled outside air.

9. An integrated air conditioning and hot water supply system as claimed in claim 2 wherein said heat recovery ventilator means comprises a housing having an exhaust chamber and a supply chamber, a heat recovery coil formed by a circuit of pipes having a refrigerant blend therein to extract heat from said pipes when in contact with hot air exhausted from said building through said exhaust chamber and causing said refrigerant to turn to a vapor state, said supply chamber having a portion of said heat recovery coil disposed therein for heating fresh air admitted hereto by condensation of said heated vaporized refrigerant blend, said supply chamber and exhaust chamber being connected to said building by said integrated air conduit means.

10. An integrated air conditioning and hot water supply system as claimed in claim 9 wherein said fresh air admitted into said supply chamber is pre-heated in a heat exchanger housing formed in a hot gas exhaust duct by said hot water tank whereby to extract heat from gases exhausted by said hot water tank and to simultaneously cool said exhaust gases to increase the efficiency of said hot water tank.

11. An integrated air conditioning and hot water supply system as claimed in claim 2 wherein said hot water tank is further connected to a domestic hot water supply line to provide hot water for use by occupants of said building.

12. An integrated air conditioning and hot water supply system as claimed in claim 11 wherein said hot water tank is a domestic hot water tank, said hot water heater having a capacity to produce hot water at temperatures of about 170° F., said domestic hot water supply line carrying hot water at temperatures of about 140° F.

13. An integrated air conditioning and hot water supply system as claimed in claim 5 wherein said hot water in said heat exchanger coil is at a temperature of about 170° F., said coil having a capacity to heat air from said building from about 70° F. to about 97° F. and producing a heating capacity of about 38,000 Btu/hr or could be higher.

14. An integrated air conditioning and hot water supply system as claimed in claim 8 wherein said return air is at 1500 CFM or higher and has a temperature of about 80° F. with about 60 percent R.H. and dehumidified by said desiccant wheel to about 25 percent R.H. and heated to about 100° F. to produce heated and dehumidified return air, said cooling means cooling said heated and dehumidified return air to a temperature of about 7520 F. with a 25 percent R.H. to produce pre-cooled air, said evaporative cooler treating said pre-cooled air to produce a treated air supply for said building at a temperature of about 65° F. with about 45 percent R.H.

15. An integrated air conditioning and hot water supply system as claimed in claim 8 wherein said outside air is at a temperature of about 95° F. with about 65% R.H. and cooled by said cooling coil to about 75° F., said humidified pre-cooled outside air being heated by said heat exchanger to a temperature of about 160° F. to regenerate said desiccant wheel before exhausting to ambient air, said combined air dehumidification means and cooling means and associated cooling coils having a cooling capacity of about 58,000 Btu/hr.

16. An integrated air conditioning and hot water supply system as claimed in claim 9 wherein said ventilator means can provide continuous ventilation at a rate of about 150

CFM or higher, said hot air exhausted from said building being at a temperature of about 70° F., said fresh air being at a temperature of about 50° F. and being pre-heated to about 12° F. in said heat exchanger housing in said exhaust duct and then further heated to about 40° F. by said condensation of said heated vaporized refrigerant blend.

17. An integrated air conditioning and hot water supply system as claimed in claim 1 wherein there is further provided control circuit means to automatically monitor the air in said building and control valves and dampers associated with said system to effect automatic operation thereof depending on the condition of said air and ambient climatic conditions.

18. An integrated air conditioning and hot water supply system as claimed in claim 1 wherein said cooling means is a CFC-free cooling means.

\* \* \* \* \*